US005568370A

United States Patent [19]
Goldstein et al.

[11] Patent Number: 5,568,370
[45] Date of Patent: Oct. 22, 1996

[54] TACTICAL POWER ADAPTER

[75] Inventors: Leonard Goldstein, Clifton; Mohammad Baz, Fairfax Station, both of Va.

[73] Assignee: VSE Corporation, Alexandria, Va.

[21] Appl. No.: 489,275

[22] Filed: Jun. 9, 1995

[51] Int. Cl.⁶ .................................. H02J 3/00; H02J 7/00
[52] U.S. Cl. ................................................. 363/34; 307/64
[58] Field of Search ......................... 363/34, 37; 323/267; 307/30, 38, 64, 66, 72

[56] References Cited

U.S. PATENT DOCUMENTS

| | | | |
|---|---|---|---|
| 3,254,291 | 5/1966 | Vaughan et al. | 363/34 |
| 3,778,634 | 12/1973 | Hanrihan | 307/64 |
| 4,240,123 | 12/1980 | Hotta | 361/96 |
| 4,384,214 | 5/1983 | Crick et al. | 307/66 |
| 4,675,538 | 6/1987 | Epstein | 307/64 |
| 4,697,136 | 9/1987 | Ishikawa | 323/267 |
| 4,723,079 | 2/1988 | Norton | 307/66 |
| 4,860,185 | 8/1989 | Brewer et al. | 363/41 |
| 4,876,460 | 10/1989 | Johnson | 307/64 |
| 5,010,469 | 4/1991 | Bobry | 363/37 |
| 5,017,800 | 5/1991 | Divan | 307/66 |
| 5,184,025 | 2/1993 | McCurry et al. | 307/66 |
| 5,189,361 | 2/1993 | Meier | 322/90 |
| 5,198,698 | 3/1993 | Paul et al. | 307/64 |
| 5,241,217 | 8/1993 | Severinsky | 307/64 |
| 5,461,262 | 10/1995 | Hirasawa et al. | 307/10.2 |
| 5,483,108 | 1/1996 | Girard et al. | 307/64 |

FOREIGN PATENT DOCUMENTS

| | | |
|---|---|---|
| 0209765 | 1/1987 | European Pat. Off. . |
| 0410716 | 1/1991 | European Pat. Off. . |
| 1176414 | 8/1985 | U.S.S.R. . |

*Primary Examiner*—Matthew V. Nguyen
*Attorney, Agent, or Firm*—Oblon, Spivak, McClelland, Maier & Neustadt, P.C.

[57] ABSTRACT

A tactical power adaptor is provided which adapts power from worldwide power sources and supplies the power to a plurality of electronic devices. A power input provides uninterruptable power to the adaptor to ensure that the input power does not interrupt the electronic device if the source is interrupted. A converter converts the input power from the worldwide sources to a power manageable by the adaptor. A plurality of connectors each supply a different variable voltage. A voltage varying circuit allows an operator to vary a voltage of the connectors and a channel selector selects between the connectors. Power switching modules supply the correct amount of power to a corresponding connector according to the voltage set by said voltage varying circuit.

20 Claims, 19 Drawing Sheets

TACTICAL POWER ADAPTER

BACKGROUND OF THE INVENTION

1. Field of the Invention

The present invention relates to a tactical power adapter and, more particularly, to a portable power adapter which adapts power from a wide range of power sources and supplies power to portable electronic devices with various power requirements.

2. Description of the Related Art

As our world becomes more technologically advanced, the demand for electrical power becomes more sophisticated. With the advent of portable electronic devices, such as lap-top computers and satellite phones, there is a great demand for an electrical power supply that is small enough to be portable, yet supplies power for increased periods of time and for a variety of voltages to accommodate various electric devices. Conventional portable power supplies are not adequately "flexible" to meet these demands and the world has, therefore, gone without a portable power supply with the flexibility to meet the needs of people located far from a stationary power outlet.

Conventionally, portable electronic devices relied on batteries for power because batteries are available in different voltage sizes to accommodate the different voltage requirements of various electronic devices. However, batteries are short lived and are disposed if they cannot be recharged. When large numbers of electronic devices are deployed, the amount of batteries disposed becomes a problem. Today's military, for example, is ever increasingly reliant on portable electronic devices which primarily rely on batteries. Military operations often require soldiers and their equipment to be far from stationary power sources for lengthy periods of time and many batteries are disposed. Campers on Campgrounds, similarly, exhaust large quantities of batteries, which power flashlights, radios and other camping equipment.

The lack of flexibility of conventional devices also impedes the integration of existing future tactical electronic devices. For example, lap-tops include batteries, but printers may not and a user, wishing to obtain a hard copy while outdoors, cannot integrate the lap-top with a printer.

The conventional devices also lack the ability to interface with worldwide electrical power sources. For example, conventional batteries made for American standard electronic devices require different adapters to be recharged from power sources around the world.

The conventional devices cannot supply power to all types of electronic devices and, therefore, require numerous conventional devices to power all of the electronic devices. Particularly, in military operations where numerous electronic devices are employed, for example, to track enemies, communicate with friendly forces and create strategies, numerous conventional power supplies are required to supply power to all the necessary electronic devices.

The conventional devices also lack the ability to provide a successful system of management of power because the conventional devices are numerous and hard to keep track of. It is simply impossible to keep track of all the batteries used. Therefore, conventional devices do not provide a power management system which allows a manager to determine how much power is being used and how much power is required in the future.

Conventional devices also supply power inefficiently. As a result, power is wasted when transferring power from batteries to the electronic devices.

In today's cost-conscientious world, there is a demand to reduce costs. Although some batteries can be recharged, the reality is that batteries are not recharged and are permanently disposed after a short life. In the military, for example, batteries must be transported away from the field of operations, otherwise an enemy may be able to track the movements of the soldiers. Fresh batteries must then be transported from around the world to the field of operations which further increases the cost of the batteries. Every disposable battery used must be replaced by a battery shipped from overseas. This results in increased air and sea-lift requirements. Also the batteries compete with other necessary items of supply for logistics buildup in a military operation. Further, shipping the batteries increases maintenance costs on the transport crafts used to transport the batteries to the theater of operations.

Heretofore, a power supply has not been available with the flexibility to support numerous portable electronic devices which can adapt power according to an operator's needs and provides system management for managing power and reducing costs.

SUMMARY OF THE INVENTION

Accordingly, it is an object of the present invention to provide a tactical power adapter which reduces or eliminates the dependency on disposable batteries and attendant costs.

It is also an object of the present invention to facilitate field integration of existing and future tactical and commercial electronic devices.

It is also an object of the present invention to replace numerous existing power supplies with a single, flexible power supply.

It is a further object of the present invention to provide a successful systems management approach to manage power.

It is a further object of the present invention to provide an efficient power adaptor.

It is a further an object of the present invention to provide power at low cost.

In accordance with the present invention, a tactical power adaptor is provided which adapts power from a variety of power sources and supplies the power to a plurality of electronic devices. A power input provides uninterruptable power to the adaptor to ensure that the input power does not interrupt the electronic device if the source is interrupted. A converter converts the input power from the source to a power manageable by the adaptor. A plurality of connectors each supply a variable voltage. A voltage varying means allows an operator to vary a voltage of the connectors and a channel selector selects between the connectors. Power switching modules supply the correct amount of power to a corresponding connector according to the voltage set by said voltage varying means.

Other objects, features and advantages of the present invention will become apparent from the following detailed description. It should be understood, however, that various changes and modifications within the spirit and scope of the invention will become apparent to those skilled in the art from this detailed description.

BRIEF DESCRIPTION OF THE DRAWINGS

A more complete appreciation of the present invention and many of the attendant advantages will be readily obtained by reference to the following detailed description considered in connection with the accompanying drawings, in which.

DESCRIPTION OF THE PREFERRED EMBODIMENTS

Figure 1:
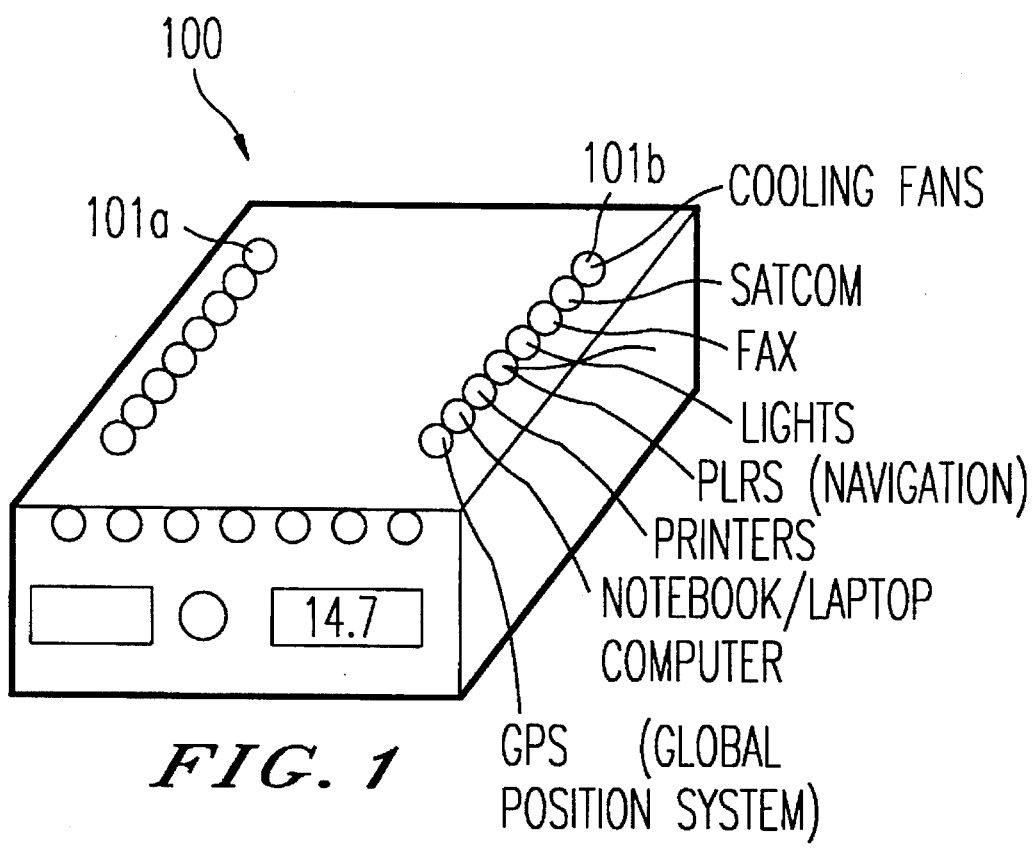
FIG. 1 is a diagram showing the tactical power adapter connected to both military and commercial portable electronic devices.
Figure 2:
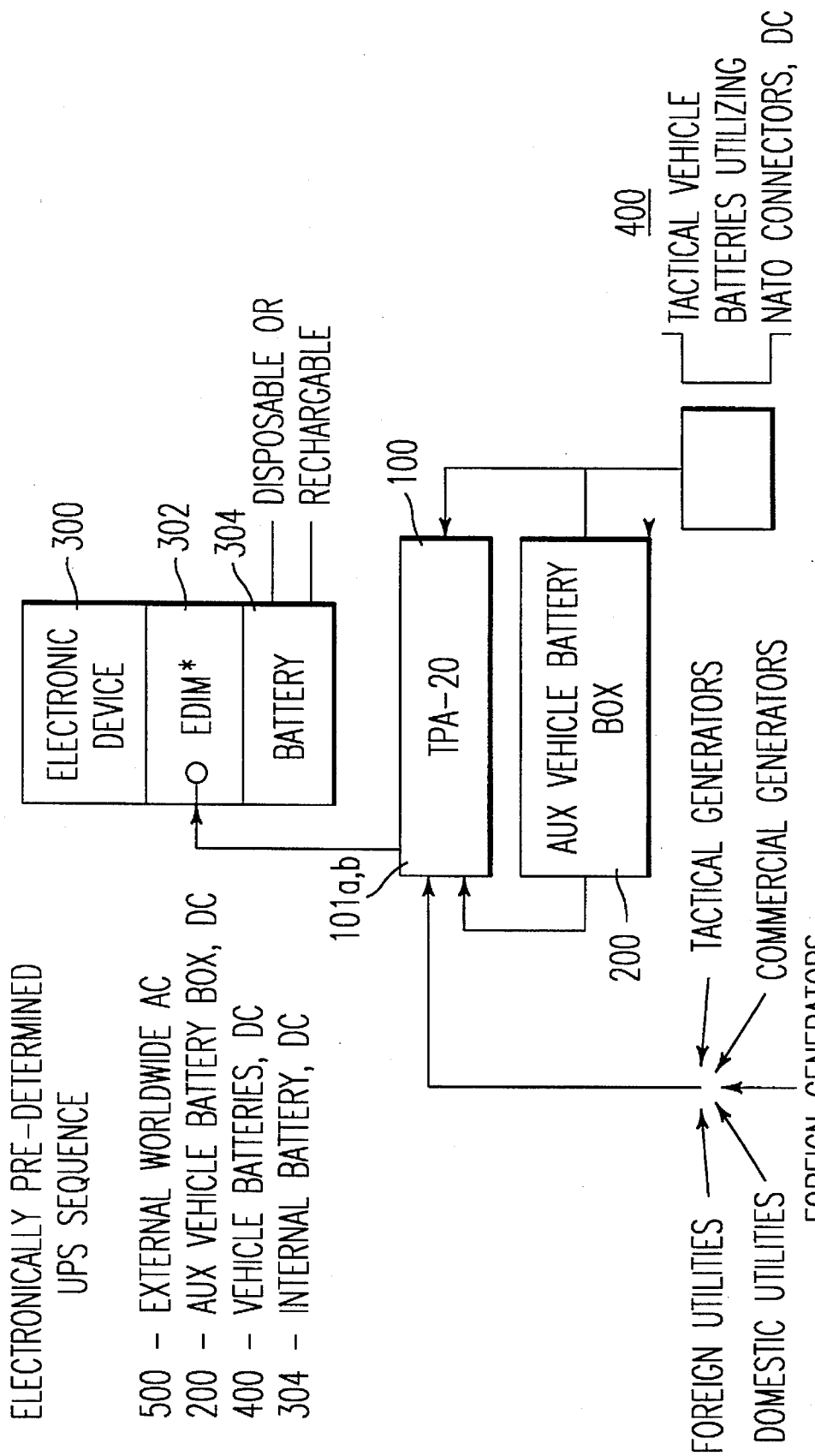
FIG. 2 is a diagram showing a block diagram of the tactical power adapter connected to power sources and an electronic device.

Referring now to the drawings, wherein like reference numerals designate identical or corresponding parts throughout the several views, and more particularly to FIGS. 1 and 2 thereof, the tactical power adaptor 100 is depicted.

The tactical power adaptor 100 provides the flexibility needed to support a plurality of electronic devices with different voltage requirements, as shown in FIG. 1. The tactical power adaptor includes 10, 28 VDC connectors 101b and 10, variable voltage connectors 101a. Both military and commercial electronic devices are supported thus providing a single power supply and making batteries obsolete. The tactical power adaptor 100 facilitates field integration of existing and commercial devices because the adaptor 100 can support different electronic devices. FIG. 2 shows that the tactical power adaptor 100 can interface with worldwide electrical power sources 500. The tactical power adaptor 100 replaces numerous existing power supplies with a single, flexible power supply. Thus, an operator can manage power more easily than in the conventional devices.

FIG. 2 is a diagram showing the tactical power adaptor 100 in operation. The tactical power adaptor 100 receives power from the auxiliary battery box 200, the worldwide sources 500 or vehicle batteries 400. The tactical power adaptor 100 is connected to an electronic device 300, via an electronic device interface module 302 (provided with the electronic device). The tactical power adaptor 100 supplies the correct voltage to the electronic device 300 or may be used to recharge the battery 304 of the electronic device 300. A discussion of the tactical power adaptor 100 and the auxiliary battery box 200 is set forth below.

Tactical Power Adaptor

Figure 3:
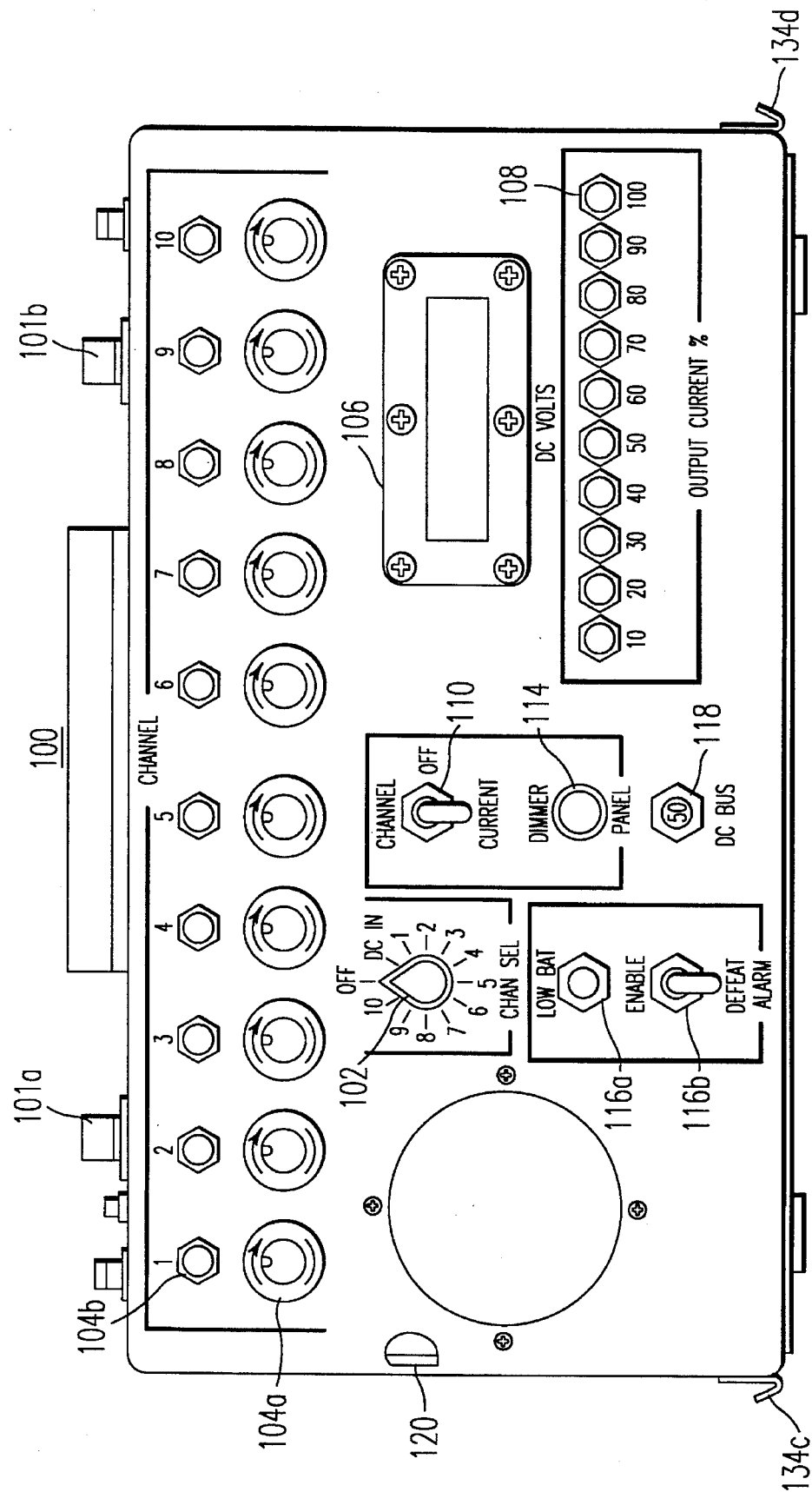
FIG. 3 shows a front view of the tactical power adapter and operating panel.

The operating panel of the tactical power adaptor 100 is shown in the front-view of FIG. 3. The operating panel includes as few controls as possible so that an inexperienced operator can quickly and easily operate the tactical power adaptor 100.

The controls include a rotary switch 102 functioning as a channel selector for selecting between ten potentiometers 104a. The rotary switch 102 can also be set to a DC IN setting for selecting the DC voltage received from external sources. The rotary switch preferably includes an integral knob lock to lock the rotary selector in place.

An operator sets the voltage of the channels using the potentiometers 104a (voltage varying means) and LEDs 104b confirm which channel is selected. A voltmeter 106 reports the voltage output by the channel indicated by the LEDs 104b. When the rotary selector 102 is switched to the DC IN setting, the voltmeter 106 displays the DC voltage input from an external source, i.e., the auxiliary battery box 200, worldwide power sources 500, or vehicle batteries 400. Preferably, the voltmeter 106 is driven through the rotary switch 102 so that, when the switch is set to the off setting, the voltmeter 106 will not unnecessarily draw power from the tactical power adaptor 100. A row of LEDs forming a current meter 108 indicate the percentage of current output from all of the connectors 101a,b as compared to the external input current.

For example, an operator wishes to power a 28 VDC heater, a 12 VDC radio and a 24 VDC GPS device. The operator connects one of the fixed 28 VDC connectors 101b to the heater and connects the radio and GPS device to variable voltage connectors 101a corresponding to channels 1 and 2, respectively. The 28 VDC heater is automatically supplied 28 VDC from the fixed voltage connector 101b. To supply power to the variable voltage connector 101a, an operator first sets the rotary switch 102 to the appropriate channel. In this example, the operator selects channel 1, the corresponding output voltage of channel 1 is displayed on the voltmeter 106 and the first LED 104b illuminates to indicate channel 1 is selected. The operator then adjusts potentiometer 104a corresponding to channel 1 and according to the voltmeter 106 to output 12 VDC to the radio. Next, the operator switches the rotary switch 102 to channel 2. At this time the voltage of the channel potentiometer can still be changed even though channel 1 is not selected. The operator, instead, operates the channel 2 potentiometer 104a until the voltmeter 106 reads 24 VDC to power the GPS device. Knob locks can be installed to lock the potentiometers 104b to their adjusted settings to avoid accidentally jarring the potentiometers.

A light switch 110 enables the LEDs 104b and 108 on the control panel and a dimmer 114 dims the LEDs 104b, 108 and the voltmeter 106. This configuration allows an operator to configure the tactical power adaptor 100 in total darkness if necessary.

A battery voltage charge indicator including an audible alarm (FIG. 14 AL1) warns an operator when external DC input from either the auxiliary battery box 200 or vehicle batteries 400 are low and an enabling switch 116b enables or defeats the low battery LED 116a alarm. Preferably, the alarm is activated when the DC output reaches 17 VDC. This prevents vehicle batteries 400 from draining below the level required to start any 24 VDC vehicle (commercial or military) in worst conditions. As soon as AC power is supplied from an external source, the alarm is silenced at which time another circuit determines when the batteries are sufficiently charged as indicated by LED 116a.

A 50 Amp circuit breaker 118 allows the tactical power adaptor 100 to adapt as much as 50 Amps from external sources. The circuit breaker 118 is preferably of the toggle type and doubles as the main on/off switch. 50 Amps is a significant amount of current and demonstrates the flexibility of the tactical power adaptor 100.

Preferably, the LEDs 104b, 108 and the voltmeter 106 emit light which is bright enough to be read in the sunlight, but has a wavelength outside the sensitive range of night vision devices. Also, Astronomers will appreciate the low light displays when their eyes are adjusted to see stars. The LEDs 104b, 108 are preferably blue indicators and the voltmeter 106 is preferably a green dot matrix display.

The front panel also includes a vent 120 which is placed high enough to allow the tactical power adaptor 100 to stand in, preferably, 2 to 3 inches of water with no damage. Thus, the adaptor 100 is rugged and can be taken on damp safaris.

Figure 4:
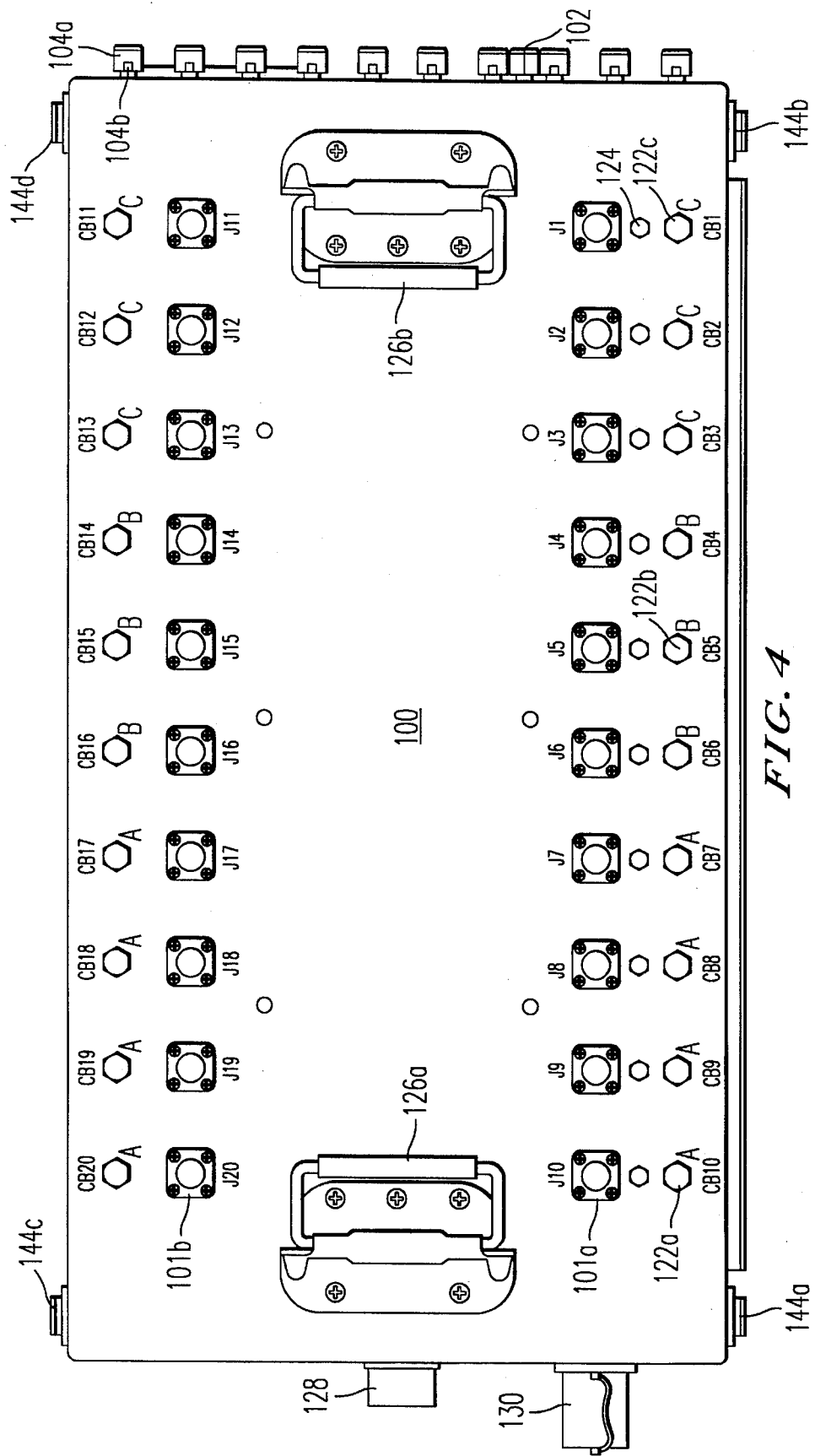
FIG. 4 is a top view of the tactical power adapter with connectors for connection to external electronic devices.

FIG. 4 shows a top view of the tactical power adaptor 100 with two handles 126a,b, connectors J1–J20 101a,b, circuit breakers CB1–20 122a,b,c and LED indicators 124. The top of the tactical power adaptor 100 is arranged to conveniently allow an operator to locate the appropriate connector and circuit breaker.

The tactical power adaptor 100 is portable. In the preferred embodiment, the tactical power adaptor 100 is a two-person lift using handles 126a,b.

There are 20 connector outputs, 10 of the outputs are non-regulated 28 VDC outputs and the other 10 are continuously adjustable over a set range, preferably 1.25 to 24 VDC. Space is provided in the control box of the tactical power adaptor 100 for an optional AC inverter, preferably a single phase 115 VAC 300 VA inverter for outputting AC voltages. All output connections are preferably made using MIL-C-5015 connectors, which are sturdy military standard connectors.

Preferably, the tactical power adaptor 100 can be equipped with cable assemblies, 15 feet long and terminating with mating connectors at the tactical power adaptor 100 end and tinned bare leads at the other end.

All connector outputs are protected and isolated with circuit breakers 122a,b,c. Preferably, the circuit breakers 122 a,b,c are the type used in aircraft and have different combinations of threshold voltages. For example, the 8 circuit breakers 122a can be rated for 7.5 Amps, the 6 circuit breakers 122b can be rated for 5 Amps and the 6 circuit breakers 122c can be rated for 3.5 Amps. Alternatively, the circuit breakers 122a,b,c can be in any range, but preferably between 0.5 and 8 Amps. The circuit breakers 122a,b,c can also be manually pulled to de-energize any particular circuit.

In our example, the operator is powering a 28 VDC heater, a 12 VDC radio and a 24 VDC GPS device. The other connectors may be disabled by throwing the circuit breakers 122a,b,c of the 20 connectors 101a,b. In this manner, the circuit breakers 122a,b,c can act as a switch or be used to isolate unused connectors.

Thus, the tactical power adaptor 100 provides a flexible range of voltages to a plurality of electronic devices. In addition, the tactical power adaptor 100 has a relatively low output noise. In the preferred embodiment, the tactical power adaptor 100 has an output noise and ripple of 20 mVP-P at rated power.

Figure 5:
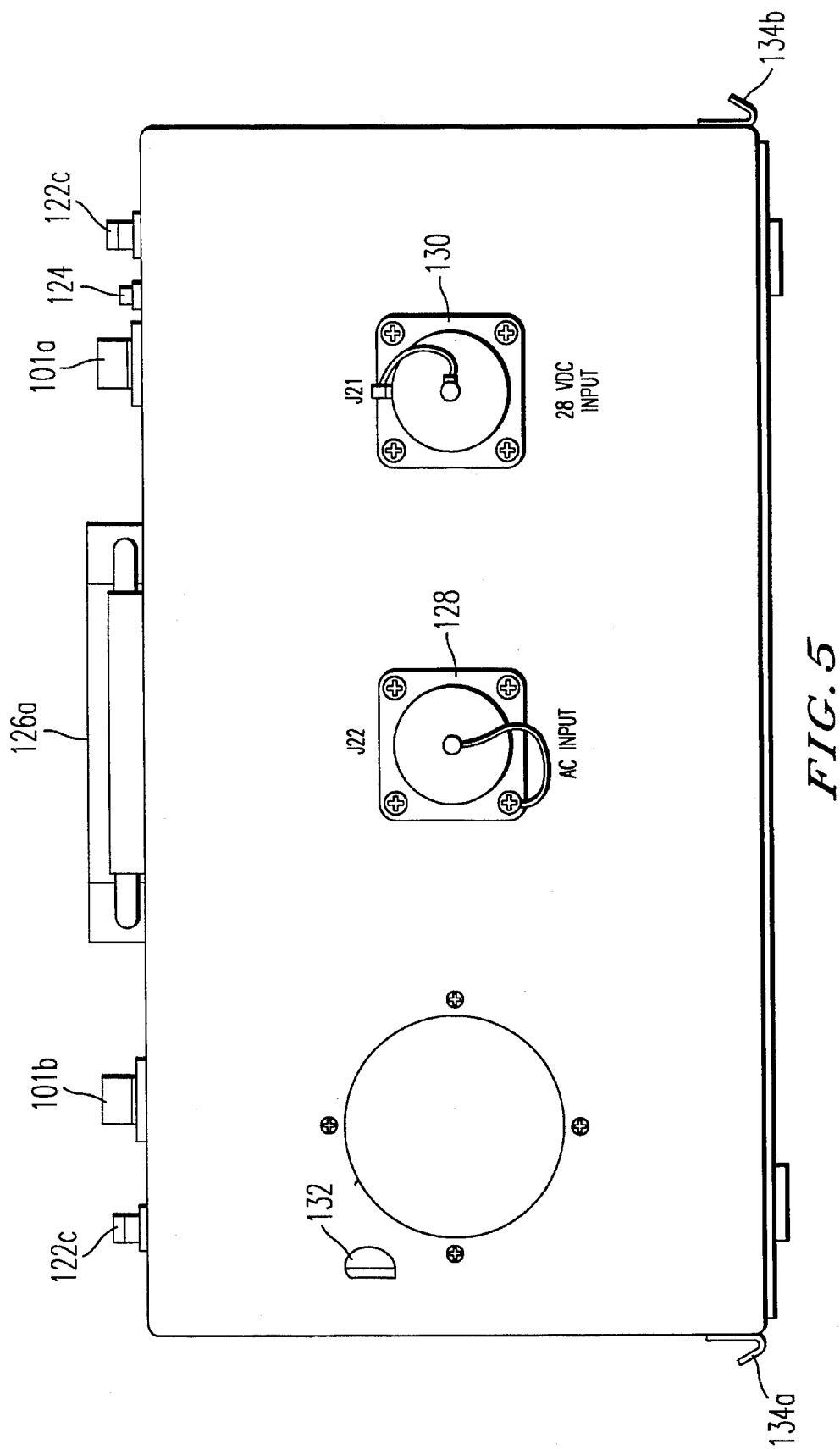
FIG. 5 shows a rear view of the tactical power adapter where AC and DC inputs connect.

FIG. 5 is a rear view of the tactical power adaptor 100 where the external power sources connect to AC and DC inputs 128, 130, respectively. These inputs can accept power from AC and DC sources anywhere in the world. For example, the AC input (and corresponding circuitry) can handle between 95 to 230 VAC at 47 to 440 HZ, which covers most standard power sources around the world. An operator simply plugs the input into the inputs 128, 130 to supply power to the connectors.

The tactical power adaptor 100 is made to be taken anywhere in the world, and the AC and DC inputs 128, 130, preferably, include military style coverings to protect the input ports 128, 130 from dirt and damage. The AC input preferably uses a MIL-C-5015 connector providing a single phase three-wire connection. The DC input 130 preferably uses the NATO standard connector manufactured by Gateway Cable.

As discussed, the tactical power adaptor 100 can interface with worldwide power sources including AC generators, DC generators, external batteries (car, military, marine, etc.), solar power generators, wind-powered generators, nuclear power generators or any voltage-current source which can be utilized to generate AC or DC voltage sources. The AC and DC inputs 128, 130 have a wide range of voltages to support input power from worldwide sources. Preferably, the AC input port 128 accepts 95 to 230 VAC at 47 to 440 Hz and the DC input port 130 accepts 28 to 45 VDC.

Power supplied from external sources to the AC input port 128 is directed to the AC to DC converter and the external power supplied to the DC input 130 is directed to the DC to DC converter. The converters (146, FIG. 7) convert input power to a manageable DC bus voltage, preferably 28 VDC. Additionally, an AC inverter may be provided which converts DC input power to AC power for supplying low power AC, preferably 110 VAC, out of the tactical power adaptor 100.

The converted power is then directed to the power switching modules 142 (FIG. 6), which switch the converted power to the voltage indicated by the potentiometers 104a. The modules are conventionally available, but are novel in the application of portable power adaptors. The modules are employed because they provide efficient switching with a minimum loss of power, thus conserving precious energy.

In the above example, an operator need not be concerned about the type of power source connected to the tactical power adaptor 100. The operator merely plugs in any power source and power is automatically converted to the correct power. In case an operator mistakenly plugs a DC source into the AC input 128, the AC-DC converter has an autosensing circuit that eliminates the need to manually switch the input transformer. The operator also need not worry whether the input source is too powerful because the 50 Amp circuit breaker 118 will switch off automatically when the input current exceeds 50 Amps.

An operator is assured that a precious source of external power will be fruitfully exhausted and not wasted. Thanks to the use of converters 146 and switching modules 142, the tactical power adaptor 100 has a high AC to DC conversion power factor, preferably 0.95.

The power from the AC to DC converter and the power from the DC input 130 is combined to form a 28 VDC bus. This bus is in series with and protected by the 50 Amp circuit breaker 118 shown in FIG. 3. As discussed, the circuit breaker 118 is preferably of the toggle-style and can be manually used as a main on/off switch.

The tactical power adaptor 100 provides uninterruptable power from the converters to the electronic devices 300. That is, when both AC and DC inputs are supplied power, the DC power will take over if the AC source is interrupted. It is preferred that the AC input 128 be given priority over the DC input 130 when both AC and DC inputs 128, 130 are connected to external power supplies because the DC power supply is usually a limited voltage battery, such as the auxiliary battery box 200. Thus, when the AC source is interrupted, the DC source is already on-line and provides true-uninterrupted power.

The tactical power adaptor 100 can include a recharge capability to recharge the DC source connected to the DC input 130 when the AC source is connected to the AC input 128. This is a useful feature when, for example, recharging vehicle batteries. In this manner, batteries can be recharged on-site and the amount of power used by batteries can be accurately managed.

Preferably, the tactical power adaptor 100 is equipped with a 35-foot AC power cable terminated with a MIL-C-5015 connector the adaptor 100 end and tinned bare leads at the AC source end. A DC power cable is also preferably supplied terminating in a standard NATO plug at each end.

In the preferred embodiment, the tactical power adaptor 100 includes a vent 132 on the rear side. As with the vent 120 on the front side, the rear side vent 132 is placed high enough to allow the tactical power adaptor 100 to sit in 2 to 3 inches of water without being damaged.

Hooks 134a,b are fixed to the bottom of the tactical power adaptor 100 for connection with auxiliary power supplies.

Figure 6:
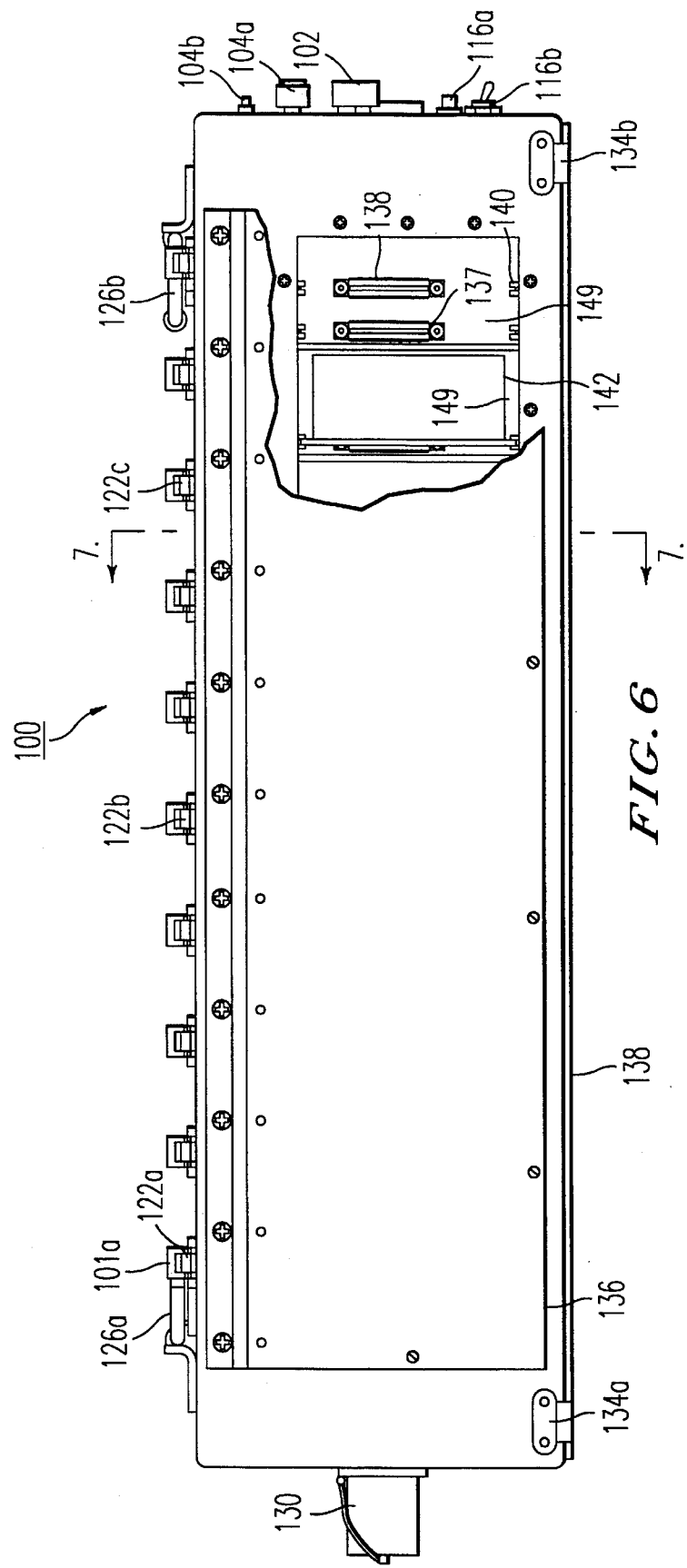
FIG. 6 shows a left side view of the tactical power adapter including a phantom view of input ports protected by a cover.

FIG. 6 shows a left side view of the tactical power adaptor 100 where an operator can open an access panel 136 and access the DC switching modules 142, which provide DC power to the 10 connectors 101a (the other connectors 101b are fixed at 28 VDC). Each module 142 is mounted on brackets 140, is slid into the tactical power adaptor 100 and is connected with module connectors 137. A bottom cover 138 seals the bottom of the tactical power device 100.

Preferably, the first module cavity 149 includes a diagnostic connector 138 which is connected to diagnostic nodes of interest on internal circuit boards (FIGS. 13–16). Thus, an operator can easily test the tactical power adaptor 100 in the field without opening the casing of the adaptor 100.

An inexperienced operator can easily replace failed modules 142 by sliding the faulty module 142 out of the brackets 140 and fitting a new module 142 in place. The failed modules 142 are replaced without having to shut off the entire tactical power adaptor 100 simply by disconnecting the corresponding circuit breaker 122a,b,c.

Preferably, each module 142 includes an LED indicating when power is applied to that module 142. When replacing modules 142, an operator need not worry about electric shock when the LED is off. In addition, the modules 142 are completely coated in the preferred embodiment to eliminate any danger of shock if an operator removes the module when the LED is on.

The tactical power adaptor 100 preferably is equipped with spare modules located behind the access panel and 5 is supplied with additional modules.

The modules 142 are preferably non-linear switching modules which are significantly more efficient than linear switching modules. A portable power supply must not waste the power of the batteries and must switch the power to the connectors efficiently. The non-linear switching modules provide switching of the power with less losses than linear devices and, therefore, provide superior power switching.

Figure 7:
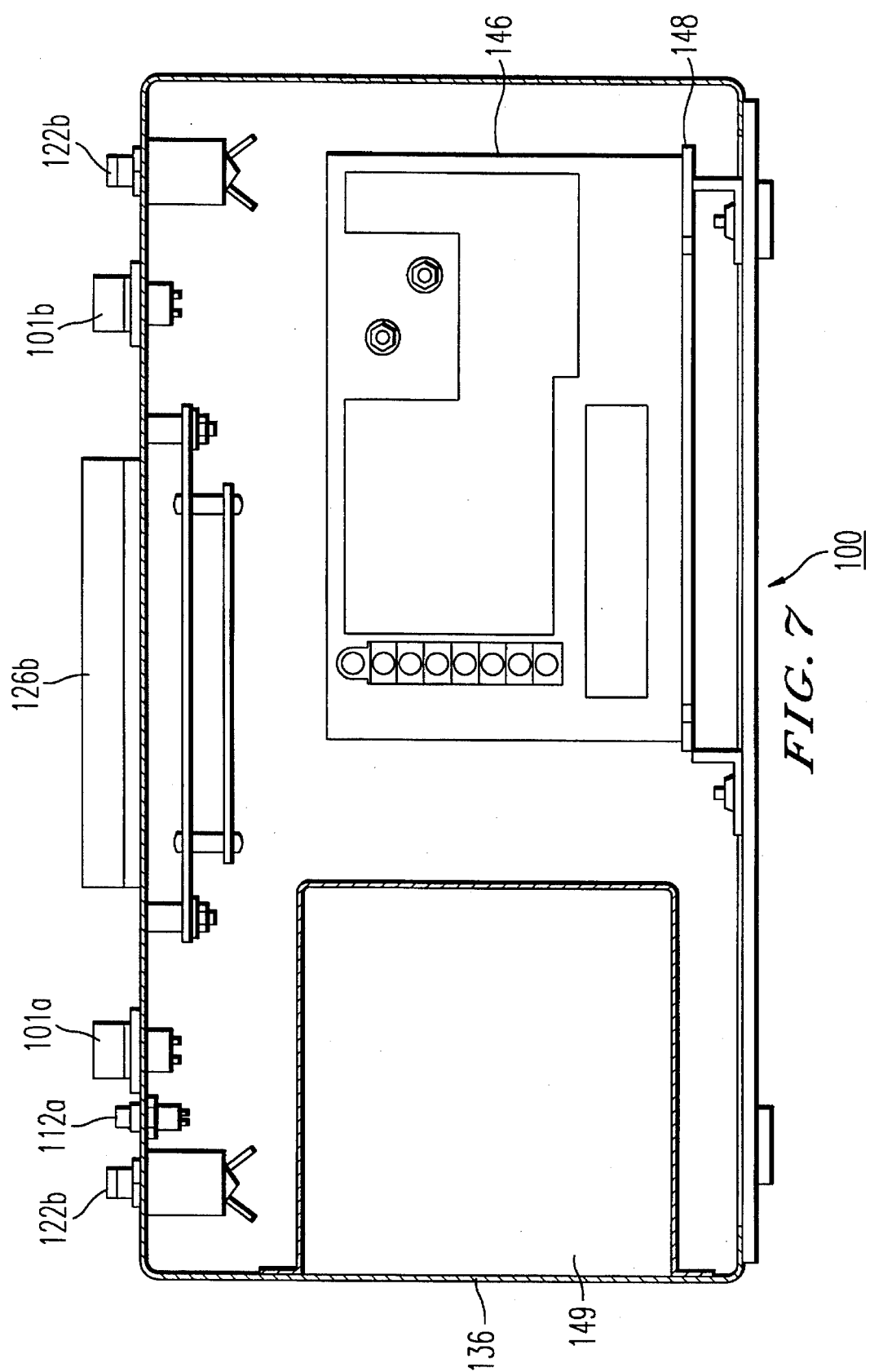
FIG. 7 is a cross sectional view of the tactical power adapter along lines VII—VII of FIG. 9.
Figure 10:
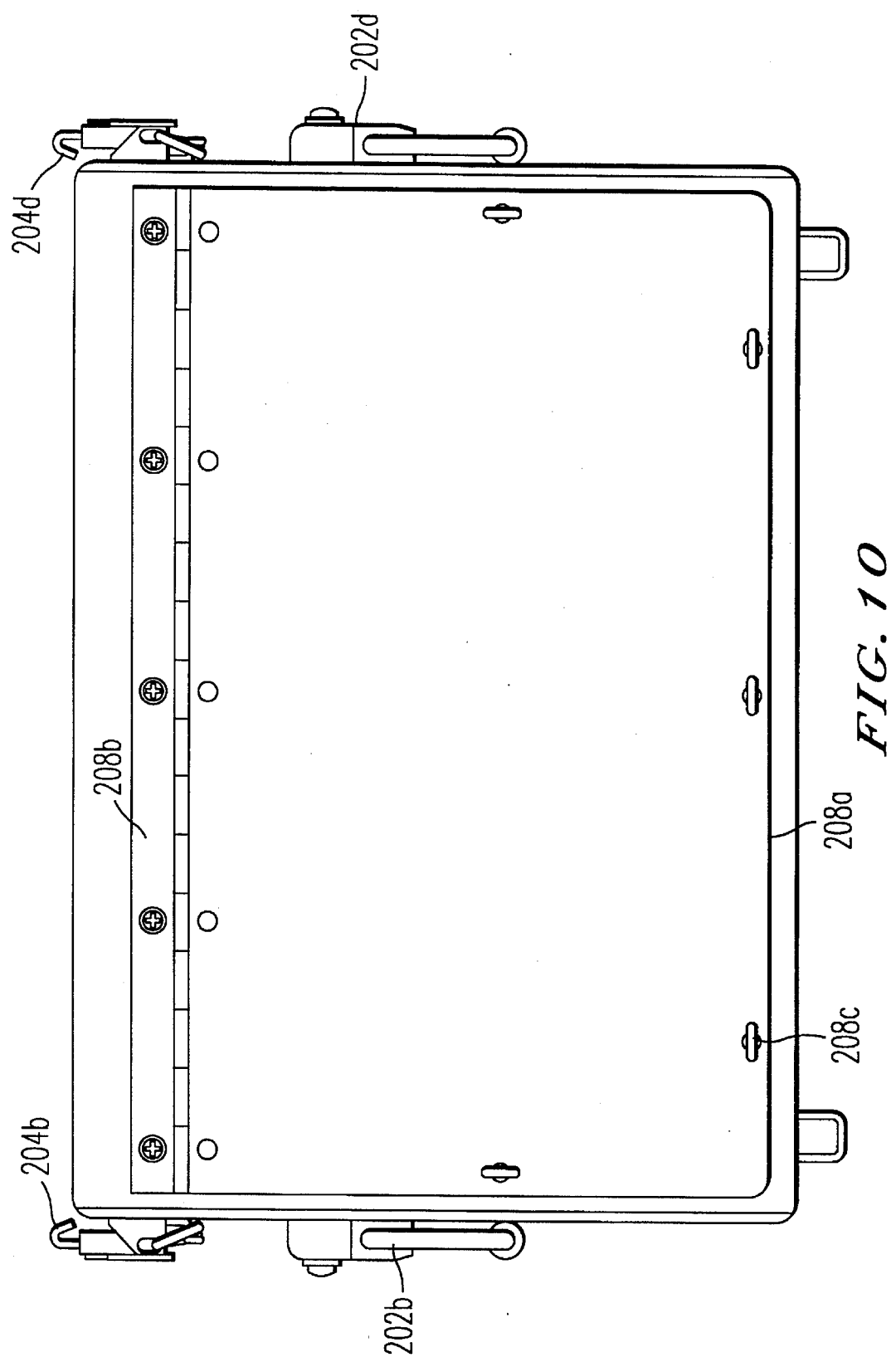
FIG. 10 is a front view of the auxiliary battery box.

FIG. 7 is a cross-sectional view of the tactical power adaptor 100 taken along lines VII—VII in FIG. 6 and shows a converter 146 mounted on a converter mounting plate 148. A module compartment 149 provides a cavity where the modules 142 are mounted behind the access panel 136. FIG. 10 demonstrates the engineering economy of the tactical power adaptor 100 because the components are combined in a logical arrangement which facilitates connection between them. In addition, an operator repairing the tactical power adaptor 100 will find it easy to locate the different components.

Tactical Power Adaptor Specifications

Preferably, the tactical power adaptor 100 is 15 inches wide, 29 inches long and 10 inches high and the auxiliary battery box 200 has the same width and length, but is 12 inches high to accommodate the batteries. Hence, the present invention provides a tactical power adaptor 100 and auxiliary battery box 200 which are small enough to be transported anywhere and which provide power to a wide variety of electronic devices. As discussed, the ventilation ports 120, 132 are high enough to allow the tactical power adaptor 100 to sit in water up to 2 to 3 inches. It is preferred that all external controls and connectors are environmentally sealed and that all internal circuit boards are coated. Thus, the tactical power adaptor 100 is still operable after being submerged in fresh water after being drained. If salt water enters the tactical power adaptor 100, the unit may be flushed with fresh water without danger of ruining the internal circuit boards. The tactical Dower adaptor 100 preferred embodiment has an operating temperature range between −40 C.° to +85 C.°.

Auxiliary Battery Box

Figure 8:
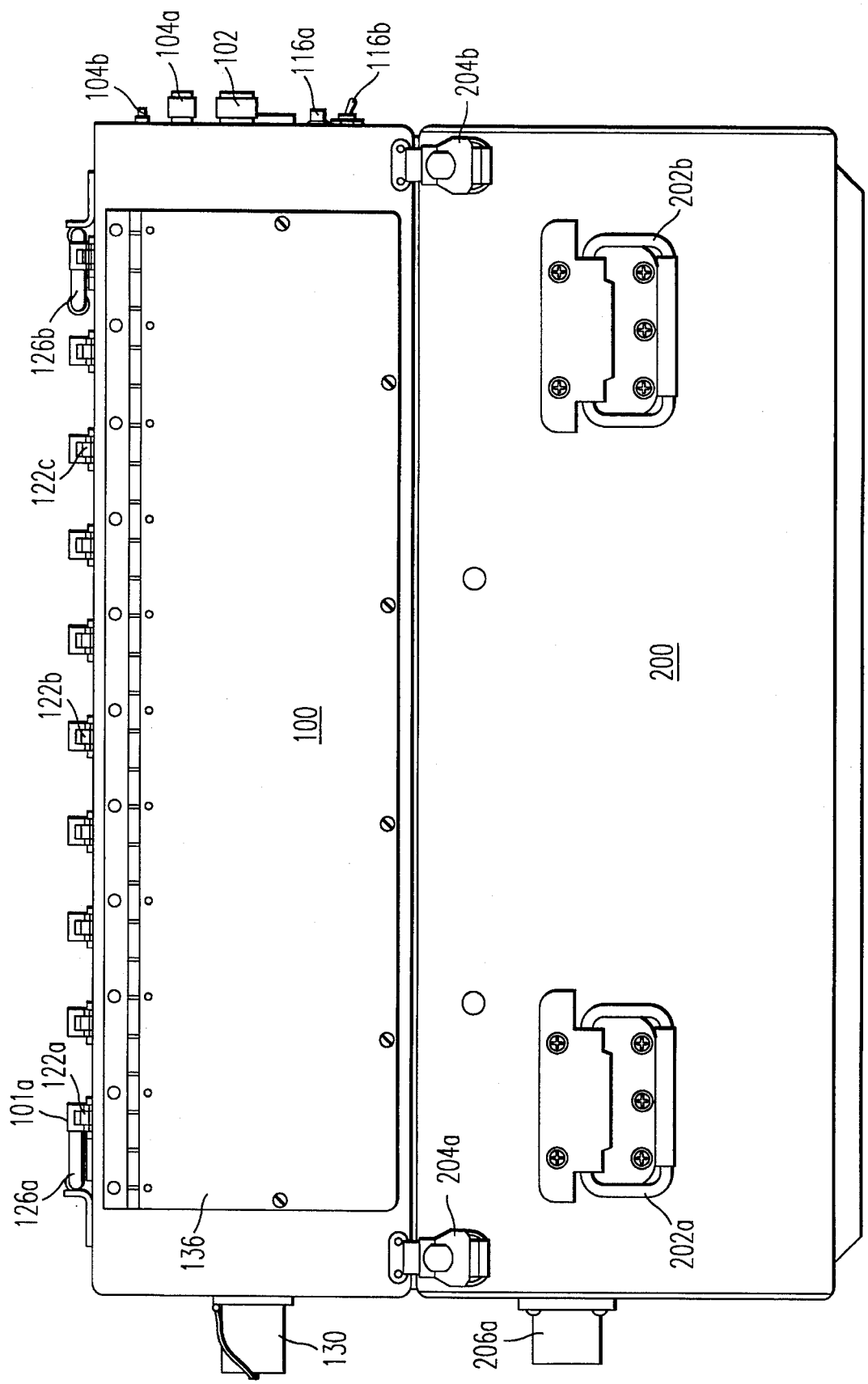
FIG. 8 is the auxiliary battery box attached to the bottom of the tactical power adapter.

The auxiliary battery box 200 is shown in FIG. 8 and may be attached to the tactical power adaptor 100 by connecting the latches 204a,b,c,d of the auxiliary battery box 200 to the hooks 134a,b,c,d of the tactical power adaptor 100. An operator can carry the auxiliary battery box 200 separate from the tactical power adaptor 100 using the handles 202a,b.

The auxiliary battery box 200 provides an operator with additional power. Preferably, the auxiliary battery box 200 includes 2 automotive batteries found in any 24 VDC vehicle. With this additional power, the tactical power adaptor 100 is a flexible and powerful tool that can supply power to a large number of devices, including automobiles.

Figure 9:
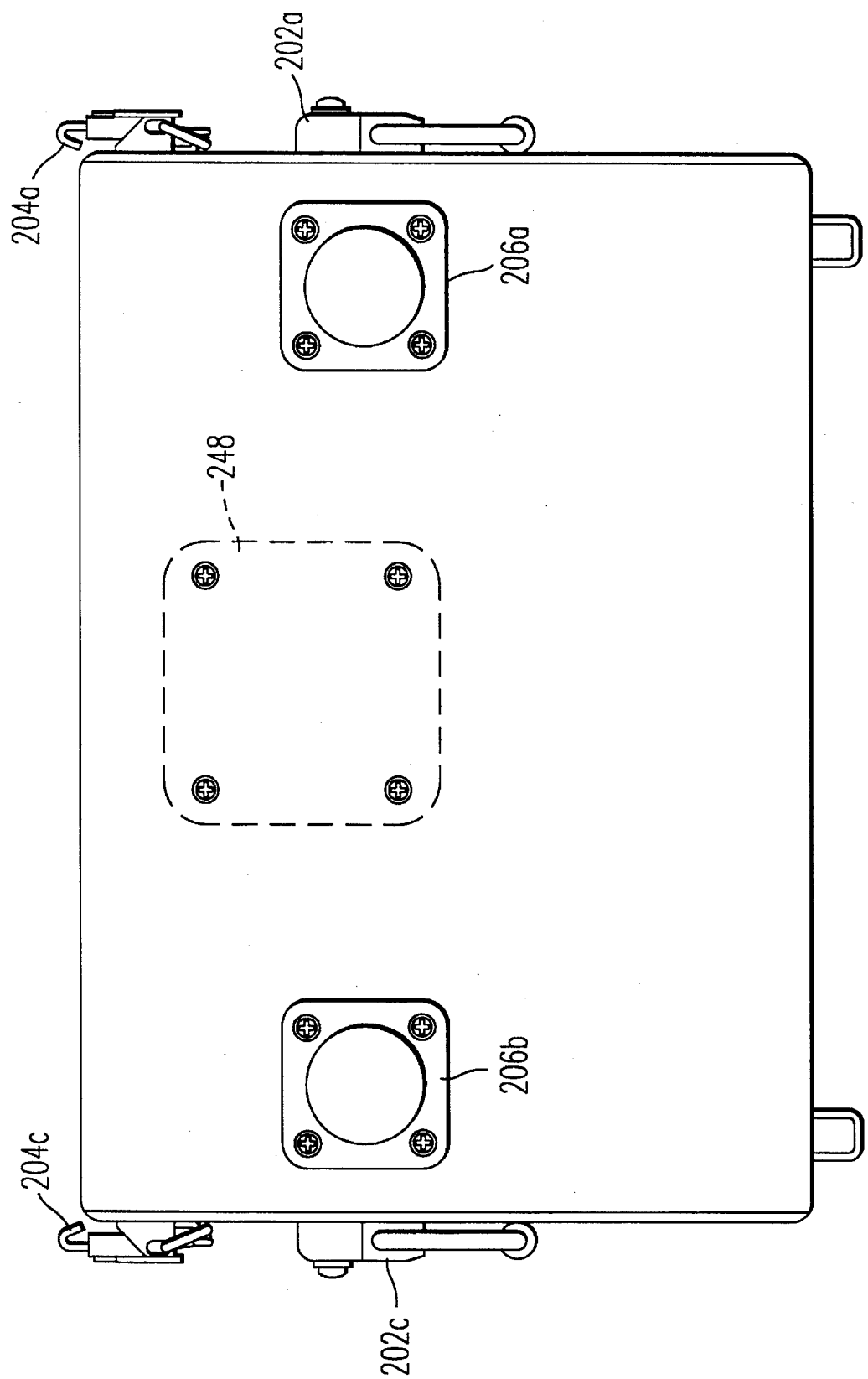
FIG. 9 is a rear view of the auxiliary battery box.

The auxiliary battery box 200 also allows an operator to "remote" the systems and return periodically to recharge the batteries. As shown in FIG. 9, the auxiliary battery box 200 includes terminals 206a,b for outputting power and recharging the batteries in the auxiliary battery box 200. The auxiliary battery box 200 includes circuitry which senses when the input voltage is greater than the battery voltage and connects the recharging supply to the auxiliary battery box 200 batteries. Preferably, the auxiliary battery box 200 is designed to be recharged by a vehicle's 32 VDC primary alternator. Thus, the recharging vehicle keeps the auxiliary battery box 200 batteries charged but prevents the system from draining the vehicle batteries at all other times.

FIG. 10 shows a front view of the auxiliary battery box 200. An access panel 208a hinged at point 208b can be opened by manipulating the clamps 208c and the operator can access the batteries of the auxiliary battery box 200.

Figure 11:
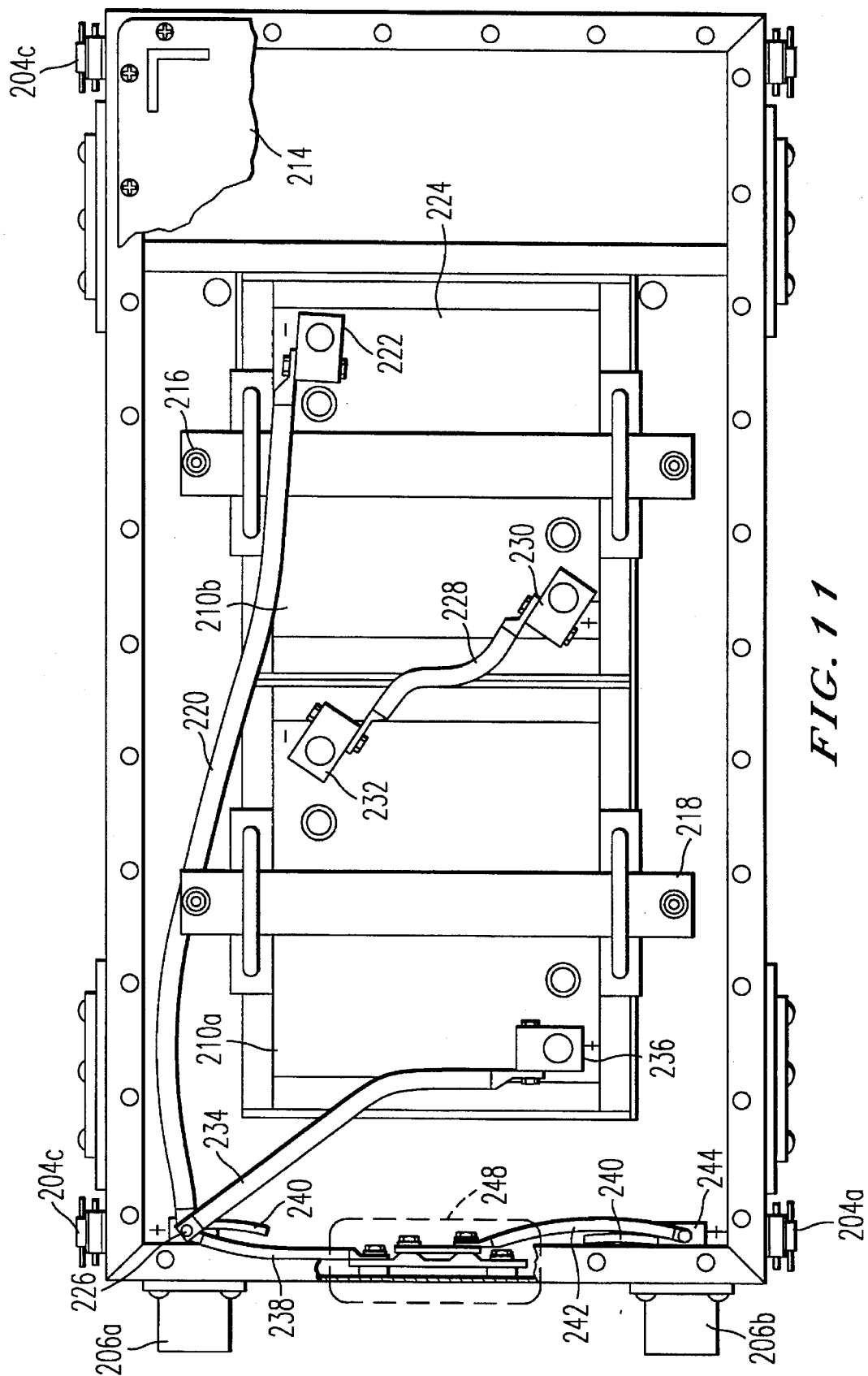
FIG. 11 is a phantom view of the bottom of the auxiliary battery box.

FIG. 11 shows a bottom view of the auxiliary battery box 200 including a phantom view inside the auxiliary battery box 200. As shown, the auxiliary battery box is designed to interfere with vehicle alternators and batteries. Batteries 210a,b are shown behind the bottom plate 214 held within the auxiliary battery box 200 by screws and brackets 216, 218. Cable 220 connects the negative terminal 222 of battery 210b to the negative terminal 226 of the terminal 206a. Cable 228 connects the positive terminal 230 of battery 210b to the negative terminal 232 of battery 210a. Cable 234 connects the positive terminal 236 of battery 210a to the positive terminal 226 of the terminal 206a. Cable 238 connects the positive terminal 226 of the terminal 206a to the chassis at 248 of the auxiliary battery box. Cable 240 connects the negative terminal of the terminal 206a to the negative terminal of terminal 206b. Cable 242 connects the positive terminal 244 of the terminal 206b to the chassis at 248.

Figure 12:
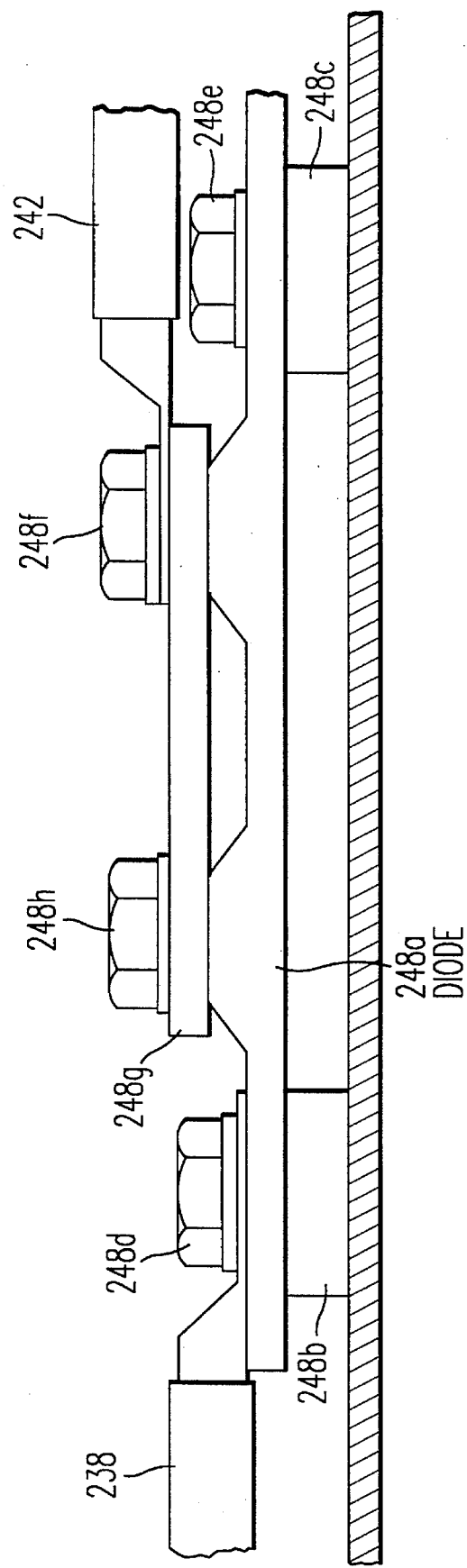
FIG. 12 is a view of a diode connected between positive terminals of the auxiliary battery box.

The auxiliary battery box 200 circuitry is configured to interface with a vehicle's battery or alternator because the auxiliary battery box 200 can be detached from the tactical power adaptor 100 and connected to vehicle batteries. FIG. 12 is a view of section 248 of the auxiliary battery box 200 connecting the positive terminals of the terminals 206a,b to a diode 248a via cables 238, 242 for this purpose. Preferably, the connection of the positive terminals to the diode is achieved by fixing a diode 248a on bumpers 248b,c. Screw 248d tightly connects the wire 238 to the plate 248a and screw 248e tightly connects the diode 248a to the second bumper 248c. Screw 248f tightly connects the cable 242 to the plate 248g, which is connected by screws f,g to protrusions 248i,j, respectively, of the diode 248a. Thus, diode 248a prevents the auxiliary battery box from losing power when connected to a vehicle battery.

Circuit Diagrams

Figure 13A:
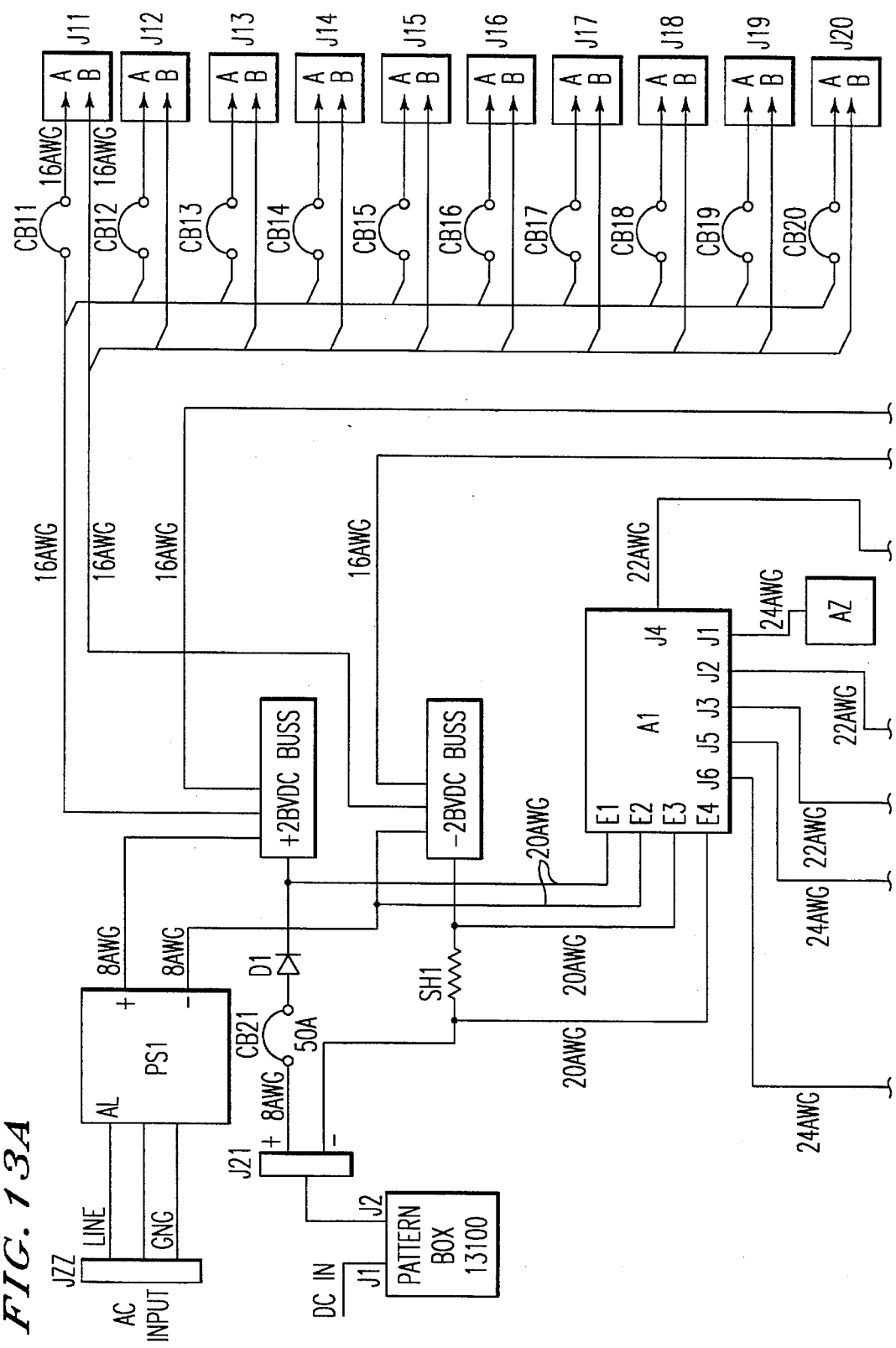
FIG. 13 is a system wiring diagram of the tactical power adapter.
Figure 13B:
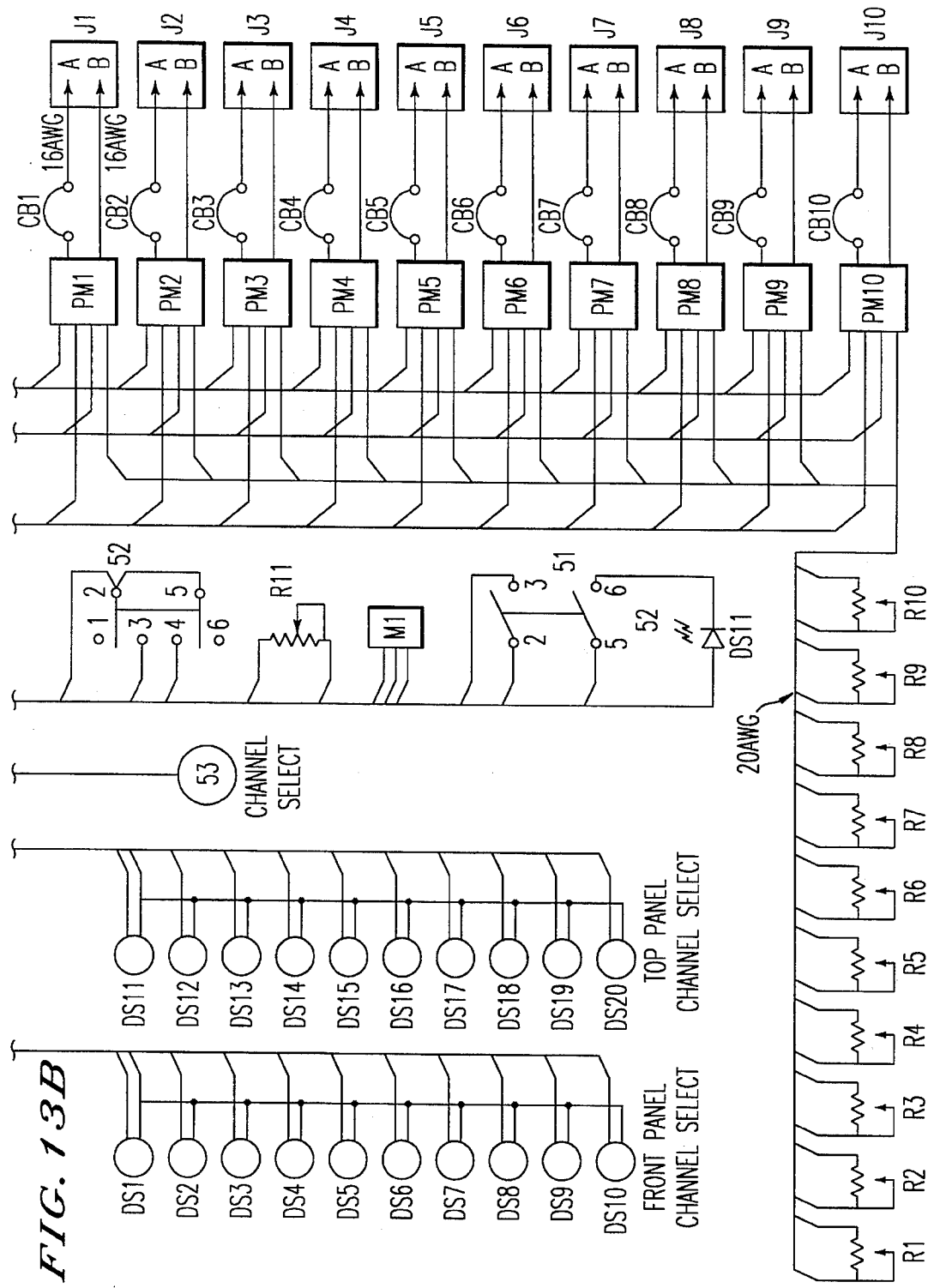
Figure 14A:
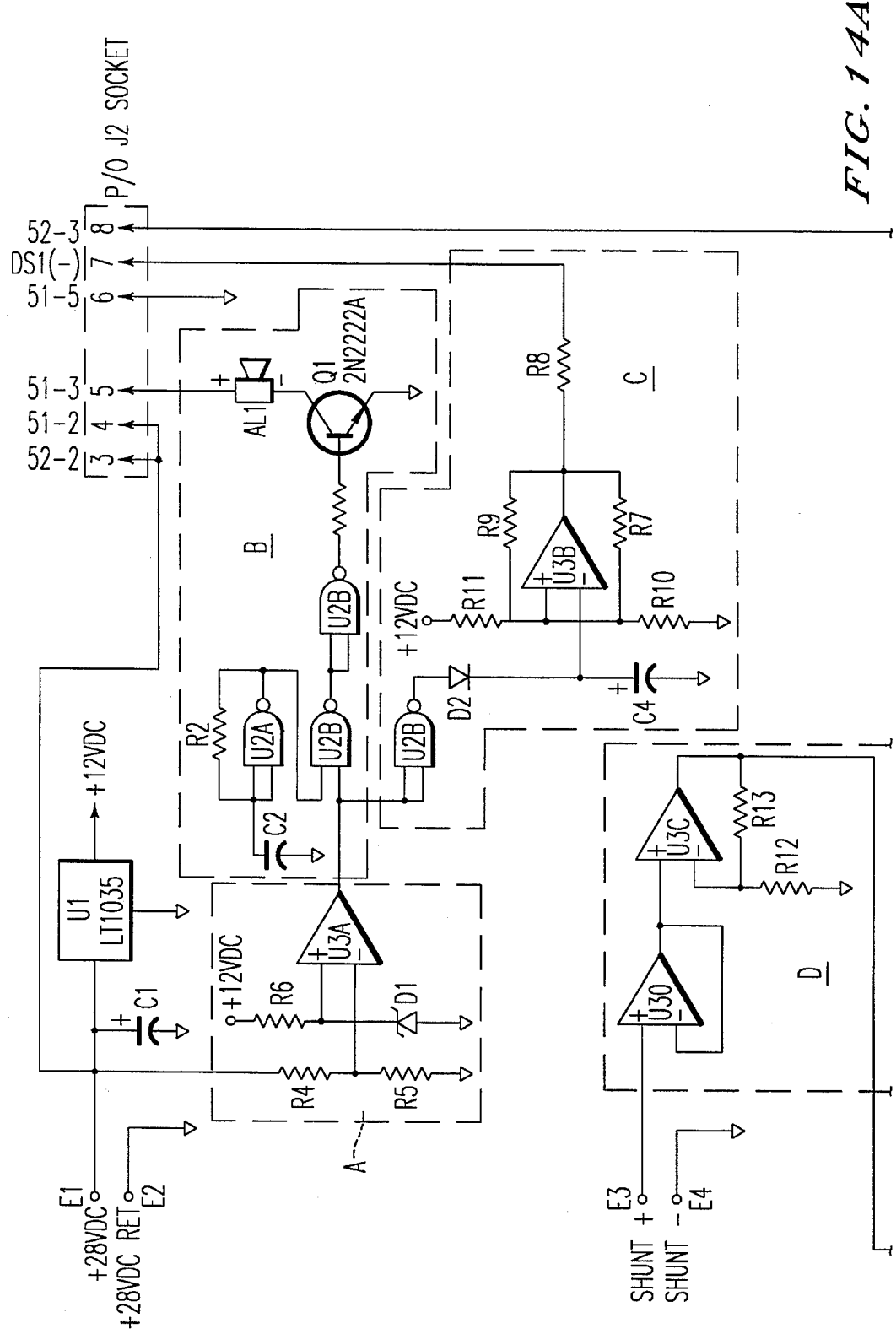
FIG. 14 shows a first part of the circuit board of the tactical power adapter.
Figure 14B:
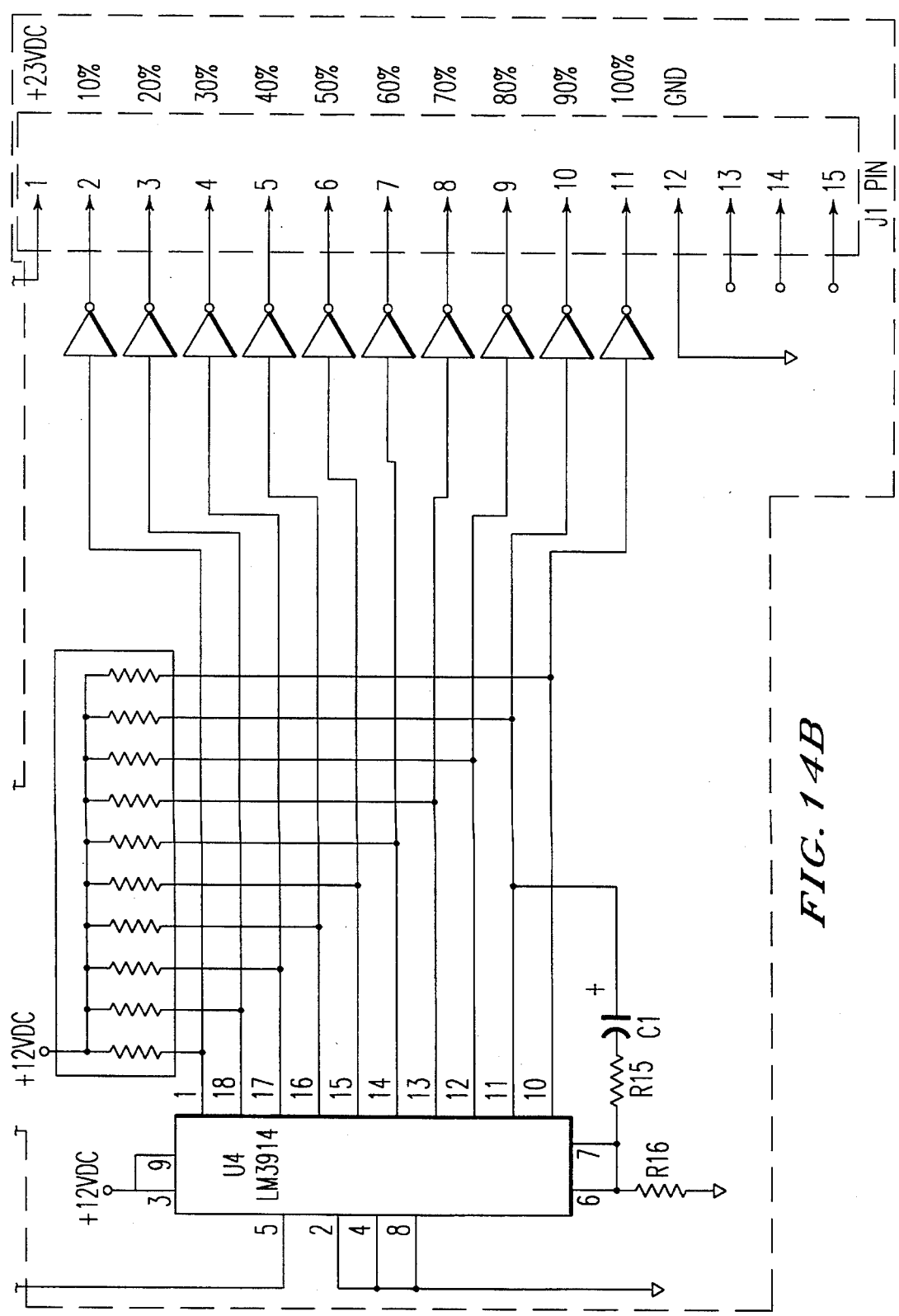
Figure 15A:
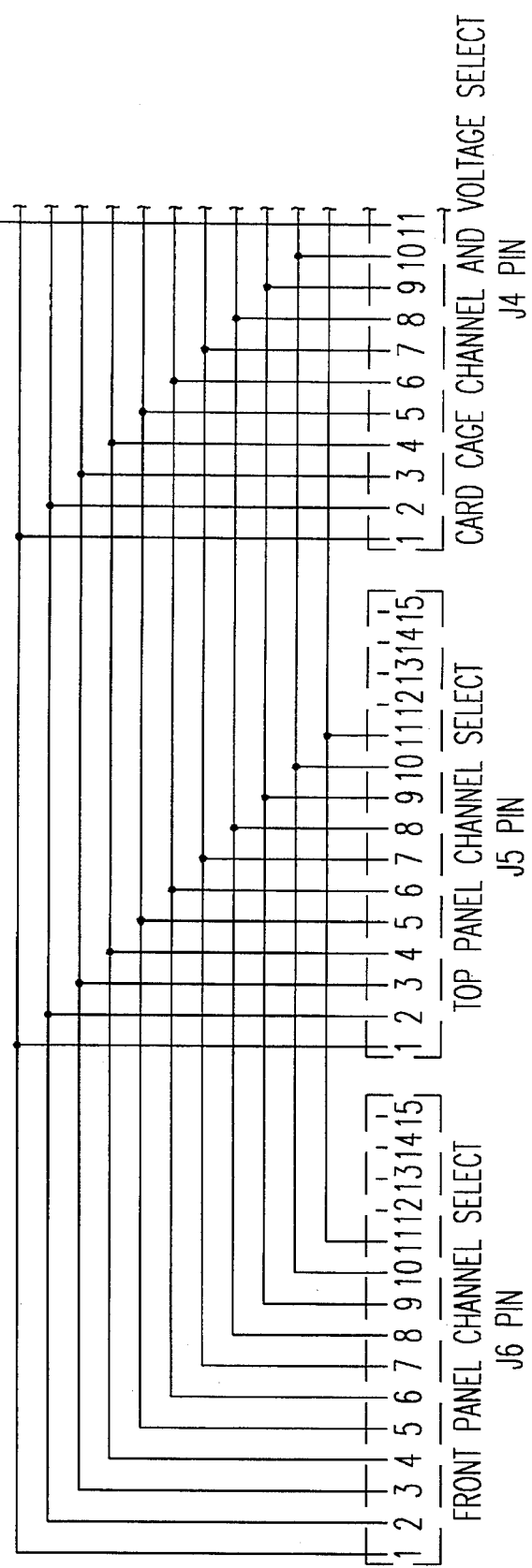
FIG. 15 shows the second part of the circuit board of the tactical power adapter shown in FIG. 14.
Figure 15B:
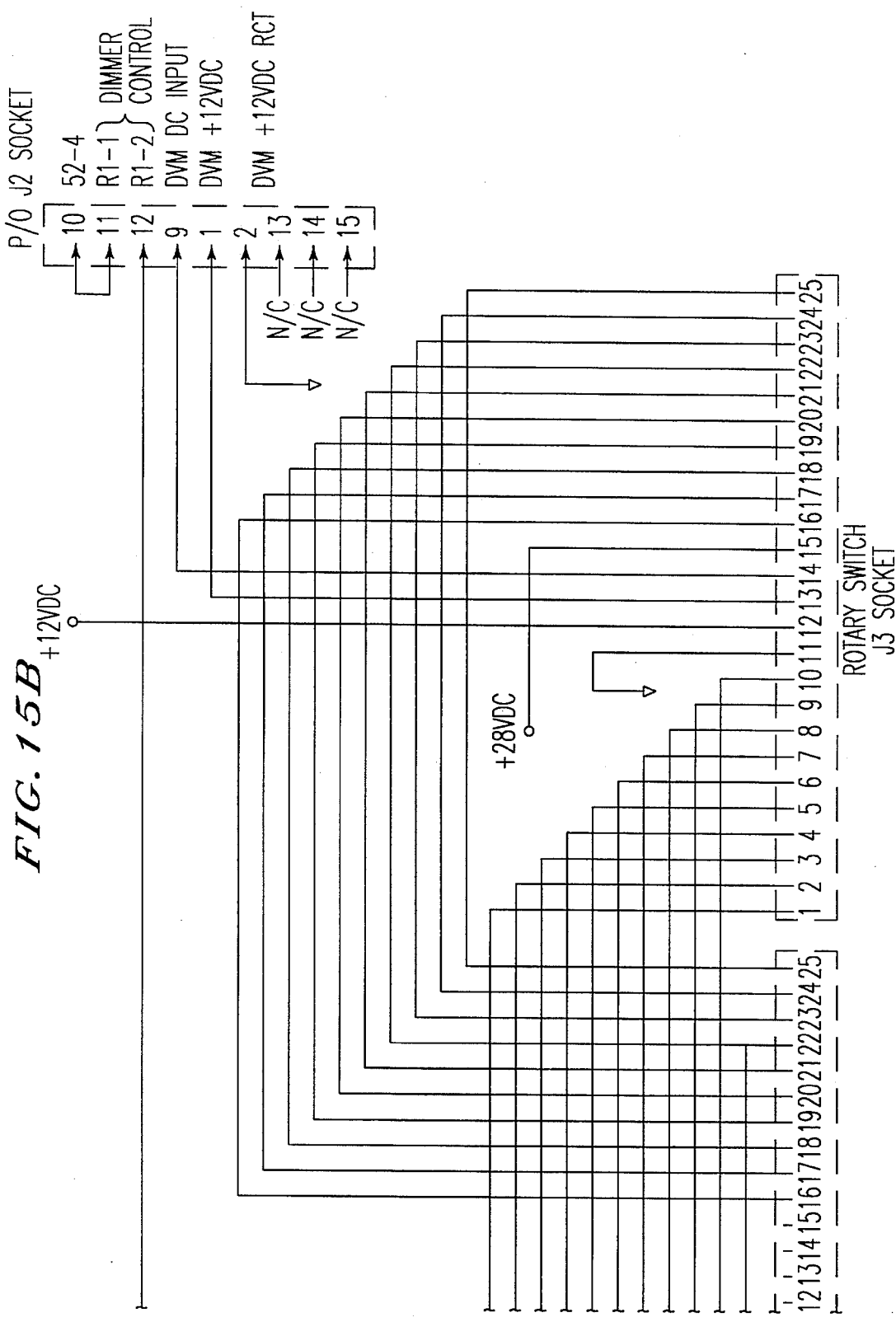
Figure 16:
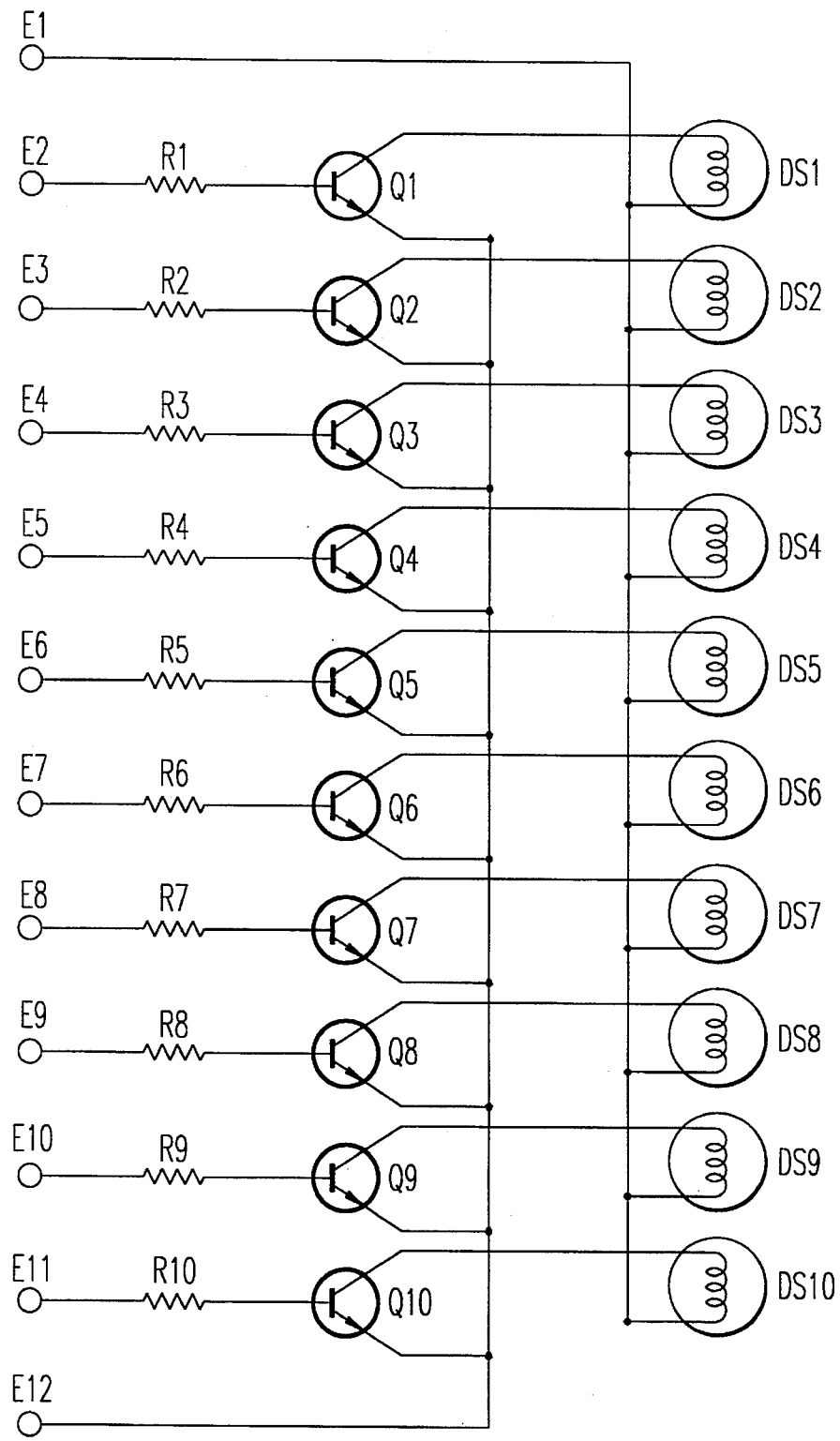
FIG. 16 is a second circuit board for the tactical power adapter.

FIGS. 13–15 are circuit diagrams of the tactical power adaptor 100. The circuit of FIG. 13 is the system wiring diagram for the tactical power adaptor 100. The circuit of FIGS. 14 and 15 is the power management processor A1 shown in FIG. 13. FIG. 16 shows a circuit corresponding to box A2 of FIG. 13 and corresponding to the current indicator 108.

The system wiring diagram of FIG. 13 shows all of the components of the tactical power adaptor 100. DC input J21 (130 FIG. 5) and AC input J22 (128, FIG. 5) input DC and AC power, respectively, into the tactical power adaptor 100. An AC to DC converter PS1 converts the AC input power to DC power and sends the DC power to a +28 VDC bus and −28 VDC bus. Similarly, the DC input sends DC power, via 50 Amp circuit breaker CB21 (118, FIG. 3), to the +28 VDC and −28 VDC buses. The DC buses send power to the 10 switching modules PM1–10 and the 10 fixed voltage connectors J11–J20 (112a,b, FIG. 4). The fixed voltage connectors J11–J20 constantly output 28 VDC power through circuit breakers CB11–20 (122a,b,c, FIG. 6). The variable voltage connectors J1–J10 output power through power modules PM1–10 (142, FIG. 9) via circuit breakers CB1–10.

The power management processor A1 controls the control panel. Potentiometers R1–R10 on the control panel (104a, FIG. 4) connect to corresponding modules PM1–10 and control the variable voltage of the variable voltage connectors J1–J10. A voltmeter M1 (106, FIG. 4) indicates the voltage and a current meter A2 (108, FIG. 4, FIG. 20) shows the current of the selected connector, respectively. A dimmer R11 (114, FIG. 4) controls the illumination devices of the tactical power adaptor 100 and a switch S1 (110, FIG. 4) switches between the channels or the current. Finally, an alarm DS11 (116a, FIG. 4) alerts an operator when the batteries are low and a switch S2 (116b) enables or defeats the alarm.

As discussed with reference to FIG. 6, the power modules 142 are of the non-linear variety and, therefore, conserve the power of the batteries. The processor A1 controls the switching of the power modules 142 and plays a significant role in handling battery power to reduce the amount of wasted power.

FIGS. 14 and 15 show the circuit diagram for the processor A1. The processor interfaces with the control panel of the tactical power adaptor 100 shown in FIG. 3.

Input E1 inputs 28 VDC from the external battery and which is sent to voltage regulator U1, via voltage smoother C1. The voltage regulator outputs 12 VDC to power the processor A1. Input E1 is also connected to pins 3,4 of the plug J2 which is output to switch S1 (the alarm enable), terminal 2, and switch S2 (the LED enable), terminal 2, to provide a reference voltage to the switches. Input E1 is also supplied to a comparator circuit A including resistors R4, R5, R6, Zener Diode D1 and amplifier U3A which compares the external battery voltage to, for example, 17 VDC. The result is then sent to two alarm circuits B, C.

Alarm circuit B emits an audible alarm from a "sonalert" alarm (commercially available) AL1 when the voltage of the external battery falls below 17 VDC, for example. Logic gates U2A, B and D combined with transistor switch Q1 switch the alarm on and off. Thus, an operator is warned when, for example, a vehicle battery has less voltage than required to start a vehicle, i.e., 17 VDC. The alarm enable on the front panel switch (116b, FIG. 3) is connected to the audible alarm to deactivate the alarm through pins 4–6, plug J2.

Alarm circuit C causes the LED 116a (FIG. 3) to flash when the audible alarm AL1 is disabled and recharging of the external battery commences. The LED 116a is connected to the flashing circuit C through pin 7 and ceases to flash when the external battery is recharged.

Input E2 is connected to ground to provide a reference voltage for the processor A1.

Inputs E3 and E4 are connected to the shunt SH1 (FIG. 13) for providing a differential voltage input to calculate the current of the external DC source. A buffer U3D has a unity gain and acts to isolate the signal of input E3. Amplifier U3C amplifies the input signal at the buffer output U3D because the voltages at E3 are usually on the order of millivolts. Bar-dot driver U4 converts the amplified signal into a series of voltages which are pulled up by resistors RP1. Resistor R15 and C7 cause all of the LEDs of the tactical power adaptor to flash when the 9th LED on the current meter 108 is illuminated, thus alerting the operator when the current of the external DC source is reaching the limit of 50 Amps. The current signals from the bar-dot driver U4 are output through inverters and to the LEDs of the current meter (A2, FIG. 13) through plug J1.

Plug J3 connects to the rotary switch (S3, FIG. 13; 102, FIG. 3). The rotary switch is fed 28 VDC through pin 16, plug J3, and a ground potential through pin 11, plug J3. When an operator selects a channel of the variable voltage connectors 101a (FIG. 3), the 28 VDC is connected to the respective LEDs on the control panel, via plug J6, and the top panel, via plug J5, to indicate which channel is selected. The rotary switch also connects the respective switching module PM1–10 (FIG. 13) to the voltmeter, via pins 1, 2 and 9, plug J2, so that the voltmeter displays the voltage of the selected channel.

Switch S2 (110, FIG. 3) is connected through pins 3, 8 and 10, plug J2, to determine what LEDs are illuminated. The dimmer R11 (114, FIG. 3) is connected through pins 11, 12, plug J2, to control the dimming of the LEDs.

FIG. 16 shows the circuitry corresponding to the block A2 of FIG. 13 which controls the current meter 108. The transistor switches are controlled by inputs E2–11 which light LEDs DS1–10 (108, FIG. 3).

In summary, the tactical power adaptor 100 provides an adaptor which converts power supplied from any external source (including the auxiliary battery box 200) to a plurality of electronic devices 300 with various power requirements. Simultaneous multiple electrical inputs from both AC and DC sources include automatic switching between two sources in an uninterruptable power supply manner. The invention also provides simultaneous, fixed and adjustable DC electrical outputs. Individual circuit breakers at each DC output provide fault isolation and a main circuit breaker switches off the entire system. An internal battery charger recharges the optional DC batteries whenever sufficient AC current is available. Circuitry is provided that informs the operator of low battery charge as well as battery fully charge. An auxiliary battery box 200 augments operating time and reduces the demand from the primary vehicle batteries and contains circuitry that permits a logical interface to the vehicle so as not to damage the vehicle batteries. The invention is small enough to transport almost anywhere and is designed for operation and repair by an untrained operator. Thus, the tactical power adaptor 100 provides the flexibility to support numerous portable electronic devices, adapts power according to an operator's needs and provides system management for managing power and reducing costs.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A portable tactical power adaptor comprising:

a power source input for providing a supply of input power;

a converter for converting the input power to a bus voltage;

power switching modules for receiving the bus voltage and for switching the bus voltage to a manually set voltage;

connectors, each corresponding to one of said power switching modules, for outputting the manually set voltage switched by a corresponding power switching module; and voltage varying means for varying the manually set voltage of said power switching modules.

2. The adaptor of claim 1, further comprising:

a channel selector for selecting a connector; and a voltmeter for displaying the voltage output a connector selected by said channel selector.

3. The adaptor of claim 2, further comprising:

an auxiliary battery box integrally connectable to the adaptor and including a battery for supplying DC power to the adaptor.

4. The adaptor of claim 3, wherein the power switching modules are non-linear switching modules which increase power efficiency of the adaptor.

5. The adaptor of claim 4, wherein the converter comprises:

an AC to DC converter for adapting externally input AC power to internal DC power;

a DC to DC converter for adapting externally input DC power to said internal DC power; and an AC inverter for adapting externally input power to internal AC power.

6. The adaptor of claim 5, further comprising:

an alarm which makes an audible sound when the power available from the adaptor drops below a predetermined threshold.

an enabling switch for enabling and defeating the alarm;

a light switch for enabling and defeating illumination devices of the adaptor;

a dimmer for manually adjusting the brightness of the illumination devices; and a current meter comprised of LED's indicating the percentage current output by a connector selected by the channel selector.

7. A tactical power adaptor comprising:

AC and DC power source inputs with automatic switching between AC and DC inputs for providing an uninterruptable supply of input power;

a converter for converting the input power to a bus voltage;

individual power switching modules for switching the input power to a plurality of manually set voltages;

voltage varying means for adjusting the manually set voltages switched by the power switching modules;

a plurality of connectors outputting the bus voltage;

a plurality of connectors outputting the manually set voltages of the power switching modules;

individual circuit breakers corresponding to the connectors outputting the bus voltage and the connectors outputting the manually set voltages;

a main circuit breaker for protecting the adaptor;

internal battery charging means for charging a DC power source; and battery voltage charge indication means indicating when the DC power source is excessively discharged.

8. The adaptor of claim 7, further comprising:

a channel selector for selecting between the connectors;

a voltmeter indicating the voltage output of a connector selected by the channel selector.

9. The adaptor of claim 8, wherein the power switching modules are non-linear switching modules.

10. The adaptor of claim 9, further comprising:

an auxiliary battery box for augmentation of batteries in the adaptor.

11. The adaptor of claim 10, wherein the converter further comprises:

an AC to DC converter for adapting externally input AC power to internal DC power;

a DC to DC converter for adapting externally input DC power to said internal DC power; and an AC inverter for adapting externally input power to internal AC power.

12. The adaptor of claim 11 further comprises a front panel comprising:

voltage varying means for varying a voltage of said connectors;

a current meter comprised of LED's indicating the percentage current output by a connector selected by the channel selector;

an alarm which makes an audible sound when the power available from the adaptor drops below a predetermined threshold;

an enabling switch for enabling and defeating the alarm;

a light switch for enabling or defeating illumination devices of the adaptor;

a dimmer for manually adjusting the brightness of the illumination devices.

13. The adaptor of claim 12, further comprising:

an access panel opened manually and providing access to the switching power modules;

wherein, the switching power modules are slidably mounted within the adaptor and frictionally connected to module connectors for easily replacing the modules.

14. The adaptor of claim 13, wherein the adaptor can adapt 95 to 230 VAC at 47 to 440 Hz and 28 to 45 VDC from an external power source.

15. The adaptor of claim 13, wherein the modules are coated to protect an operator from shock when manually replacing the modules.

16. The adaptor of claim 15, wherein, the plurality of connectors outputting a fixed voltage output are at least ten in number and output 28 VDC; and wherein, the plurality of connectors outputting a variable voltage are at least ten in number and output between 1.25 and 24 VDC.

17. The adaptor of claim 16, wherein the AC inverter is single phase and outputs 115 VAC 300 VA.

18. The adaptor of claim 17, wherein the circuit breakers have a rating in a range between 0.5 and 8 Amps.

19. The adaptor of claim 18, further comprising:

vents located at a height allowing the adaptor to sit in as much as two inches of water and water cannot get into the adaptor.

20. The adaptor of claim 19, wherein, the adaptor is manually portable by two people; and wherein, the adaptor is no greater than fifteen inches wide, twenty-nine inches long and ten inches high.

* * * * *